G. B. Waller.
Churn.

N° 60,097.  Patented Nov. 27, 1866.

Witnesses:
Theo. Tisch
Wm. Truvin

Inventor:
G B Waller
per
Munn & Co
Attorneys.

United States Patent Office.

IMPROVEMENT IN CHURNS.

G. B. WALLER, OF FRANKLIN, ILLINOIS.

Letters Patent No. 60,097, dated November 27, 1866.

SPECIFICATION.

TO ALL WHOM IT MAY CONCERN:

Be it known that I, G. B. WALLER, of Franklin, in the county of Morgan, and State of Illinois, have invented a new and useful Improvement in Churn; and I do hereby declare that the following is a full, clear, and exact description thereof, which will enable others skilled in the art to make and use the same, reference being had to the accompanying drawings, forming a part of this specification, in which—

Similar letters of reference indicate like parts.

My invention has for its object to furnish an improved churn, by means of which the cream may be thoroughly aired while being agitated, and by the use of which the churning may be done in a very short time, and with a small outlay of power; and it consists in the combination of two or more inclined tubes and an inverted cylindrical cup with the vertical dasher-shaft, as hereinafter fully described.

Figure 1:
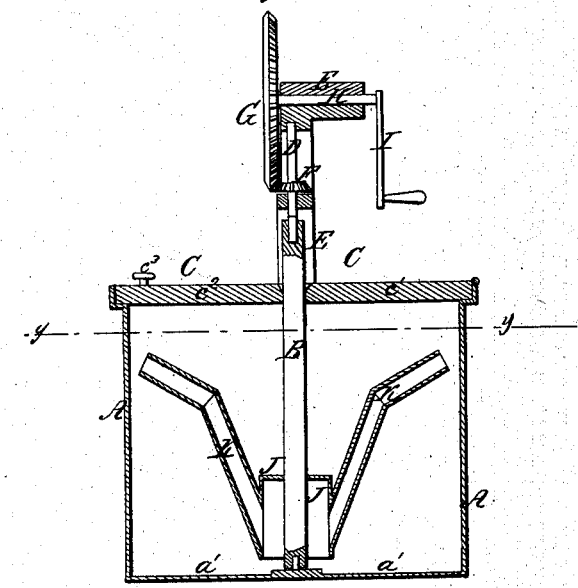
Figure 1 is a vertical section of my improved churn, taken through the line $x\ x$, fig. 2.
Figure 2:
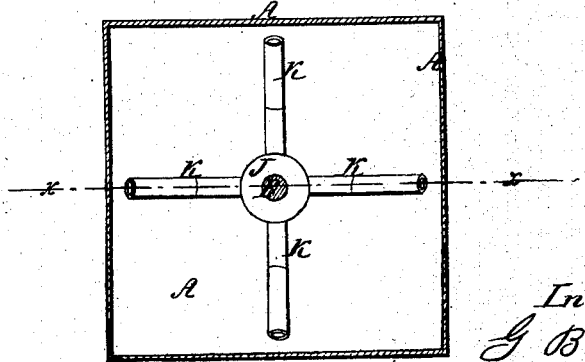
Figure 2 is a horizontal section of the same, taken through the line $y\ y$, fig. 1.

A is the body of the churn, which may be square, as shown in the drawings, or round, and of any desired size, the shape and size being wholly immaterial. B is the dasher-shaft, in the lower end of which is formed a socket, into which enters a pivoting-pin, secured to the centre of the bottom, $a^1$, of the churn body A. The dasher-shaft B passes up through a hole in the centre of the lid or cover, C, and in its upper end is formed a square socket, into which fits the square lower end of the shaft D. The shaft D revolves in bearings in the frame E, and carries a small bevel gear-wheel, F, the teeth of which mesh into the teeth of the bevel gear-wheel G, attached to the end of shaft H. The shaft H revolves in bearings in the frame E, and to its other end is attached the crank I, by means of which the churn is operated. The cover, C, is divided into two parts, $c^1$ and $c^2$, one of which, $c^1$, is hinged to the side of the body, A, of the churn, as shown in fig. 1. The frame, E, which carries the gearing, is attached to this part, $c^1$, of the cover, so that by turning back the said part of the cover the gearing is detached from the dasher-shaft, B, and moved out of the way. $c^3$ is a knob attached to the part $c^2$ of the cover, by means of which the said part may be lifted off. To the lower part of the dasher-shaft B is attached an inverted cylindrical cup, J, as shown in fig. 1, to the sides of which are secured the lower ends of two or more inclined tubes, K. The number of these tubes is not essential; but I prefer to use four. The upper ends of the tubes, K, may be bent over towards a horizontal position, as shown in figs. 1 and 2, so as to project the cream that rises through them towards the sides of the churn. The upper ends of the tubes K must project above the surface of the cream in the churn. By turning the crank, I, a rapid rotary motion will be given to the dasher-shaft B and tubes K, the effect of which is to draw the cream into the inverted cup, J, which will be driven thence by centrifugal force through the tubes, K, and will be projected from the upper ends of said tubes through the air in the upper part of the churn body, thus becoming so thoroughly mixed with air, and being so thoroughly agitated, as to bring the butter in a very short time. At the same time the resistance offered by the cream to the passage of the tubes through it is so very little that the labor of churning is exceedingly light. If desired, the inverted cup, J, may be omitted, and the lower ends of the tubes, K, be secured directly to the lower end of the shaft B, or to a head attached to or forming upon the lower end of said shaft.

Having thus described my invention, what I claim as new, and desire to secure by Letters Patent, is—

1. The combination of two or more inclined tubes, K, with the dasher-shaft B, substantially as herein shown and described and for the purpose set forth.

2. The combination of the inverted cup J and two or more inclined tubes K, with the dasher-shaft B, substantially as herein shown and described and for the purpose set forth.

3. The combination and arrangement of the inclined tubes K, inverted cup J, dasher-shaft B, shafts D and H, gear-wheels F and G, and frame E, with each other, with the cover C, and with the body A of the churn, substantially as described and for the purpose set forth.

G. B. WALLER.

Witnesses:
 J. W. HARN,
 J. DICKINSON.